Nov. 6, 1951     L. LEITZ     2,574,115
MAGNETIC LENS, ESPECIALLY FOR ELECTRON OPTICAL SYSTEMS
Filed Aug. 10, 1950
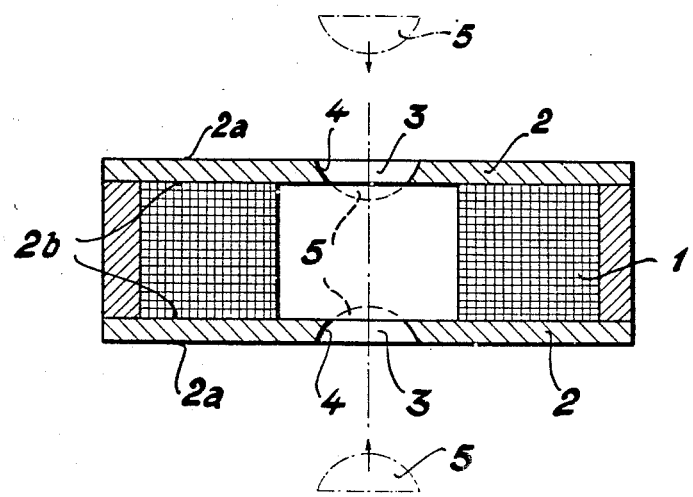
INVENTOR.
Ludwig Leitz
BY
Benj. T. Rauber
his attorney Patented Nov. 6, 1951

2,574,115

UNITED STATES PATENT OFFICE 2,574,115

MAGNETIC LENS, ESPECIALLY FOR ELECTRON OPTICAL SYSTEMS

Ludwig Leitz, Wetzlar-Lahn, Germany, assignor to Ernst Leitz, G. m. b. H., Wetzlar, Germany, a corporation of Germany Application August 10, 1950, Serial No. 178,595
In Germany December 30, 1949

8 Claims. (Cl. 313—84)

My invention relates to a magnetic lens as applied to electron optical systems, for example in electron microscopes.

In these systems the magnetic lenses may be permanently magnetic as well as electro-magnetic.

Heretofore it was common to provide the pole shoes of magnetic lenses with plane or cylindrical surfaces, or plane surfaces combined with torus surfaces.

Great demands were made on the exactness of position of the surfaces since their quality essentially influenced the perfection of the electron optical portrait, and special difficulty consisted in attaining a complete symmetry of the pole shoes to each other and of the cylinder boring relative to the other surfaces of the pole shoes.

To obviate these difficulties the present invention forms the active surfaces of the pole shoes of magnetic lenses of the above type by grinding methods for optical glasses such as by rotating curved abrading tools or laps. Thereby at least two of the electron optically active surfaces of each pole shoe of the above type which are formed by grinding methods for optical glasses, are arranged in rotational symmetry so that they jointly form a common border, and at least one of the surfaces curves spherically with a finite radius. The center of curvature of the spherically bored surfaces lies, for this purpose, upon or outside of the boundary surfaces of each pole shoe on the symmetrical axis of the system formed from the pole shoe. The spherically bordered bore of the magnetic di-poles are in a further embodiment of the invention arranged with their smaller diameters toward each other.

In the embodiment of the invention for special purposes the pole shoes will be formed of plane parallel plates, formed by means of laps with infinite radius, conforming to grinding processes for optical glasses, whose bores are provided with spherical surfaces with finite radius formed according to the same method.

For certain purposes the pole shoes ground and polished by grinding methods for optical glasses are subjected before the finished polishing to vapors, for example, of cobalt and/or iron, in a high vacuum.

Magnetic lenses of the above type permit their active surfaces to be formed with the same precision as optically active surfaces of glass optics. Their active surfaces permit themselves accordingly to be arranged in the most favorable manner for the paths of the lines of force.

According to the invention they permit, moreover, the application of optical adjusting methods for the adjusting of electron optical systems in this manner that, by means of optical test lenses, for this purpose plano-convex lenses, placed in the bore with spherical boundary surfaces of the plane parallel pole shoes, may be adjusted by autocollimating or interferometric control means directed to these plane parallel plates, and by means of an adjusting spindle the reflex picture of the optical lens may be made axially correct.

The various features of the invention are illustrated by way of example in the accompanying drawing.

In this drawing a magnetic lens 1 comprises the plane parallel pole shoes 2 which are provided with centrally arranged bores 3. The plane parallel surfaces 2a and 2b of the pole shoes 2 are obtained through plane parallel polishing on an interferometric control. The boundary surfaces 4 of the borings 3 are spherically ground and polished. The control follows that in the glass optical methods of the usual manner with a test glass.

The finishing polishing of the plane parallel 2a and 2b as well as the spherical surfaces 4 follows a previous subjection of these surfaces to the vapors of cobalt and iron in high vacuum in order to attain the very highest homogeneity of the boundaries of the pole shoes, especially on those of the sharp edges and on those surfaces most important for the magnetic field.

For adjustment, plano-convex optical test lenses 5 are laid into the boring 3 and their plane surfaces are brought parallel to the surfaces of the pole shoes 2 by autocollimetric control or parallel interference. On the adjusting spindle there follows finally the centering of the pole shoes corresponding to the reflex portrait of the lenses. The adjusting can in any event be also obtained by the help of interference with corresponding interference microscopes.

Having described my invention, what I claim is:

1. Magnetic lens for electron optical systems comprising a magnet with at least one ring shaped pole shoe with a passage opening for the electron rays, at least one of the electron active surfaces bordering the passage opening for the electron rays is of spherical curvature.

2. Magnetic lens for electron optical systems which comprises a magnet with two parallel plane pole shoes with two coaxial openings for the passage of electron rays each having an electron optically active bordering surface of spherical surface, in which the center of spherical curvature lies at a finite distance outside of the pole shoe plate and in the axis of the system.

3. The magnetic lens of claim 1 having polished deposit on a high vacuum condensate of a ferromagnetic element.

4. The magnetic lens of claim 2 having polished deposit of a high vacuum condensate of a ferromagnetic element.

5. The magnetic lens of claim 3 is which said ferro-magnetic element is iron.

6. The magnetic lens of claim 3 in which said ferro-magnetic element is cobalt.

7. Method for forming pole shoes for magnetic lenses of electron optical systems with precisely formed electron optically active border surfaces which comprises grinding said border surfaces to a spherical curvature with a complementary spherical grinding surface and controlling said grinding with a collimating control.

8. The process of forming and adjusting the magnetic lens of an electron optical system which comprises grinding an opening in each of a pair of spaced plane parallel pole shoes to a border of spherical curvature, placing a plain convex lens in said opening, adjusting the plane surface of said lens to parallelism to the plane surfaces of said pole shoes and adjusting said pole shoes by means of a centering spindle.

LUDWIG LEITZ.

REFERENCES CITED

The following references are of record in the file of this patent:

UNITED STATES PATENTS

| Number | Name | Date |
| --- | --- | --- |
| 2,301,975 | Ruska | Nov. 17, 1942 |
| 2,356,535 | Ruska | Aug. 22, 1944 |
| 2,454,094 | Rosenthal | Nov. 16, 1948 |
| 2,510,634 | Hull | June 6, 1950 |